(12) United States Patent
Taneda et al.

(10) Patent No.: US 8,371,595 B2
(45) Date of Patent: Feb. 12, 2013

(54) LOWER PART STRUCTURE IN VEHICLE BODY REAR PART

(75) Inventors: Kodai Taneda, Shizuoka-ken (JP); Koji Uchida, Shizuoka-ken (JP)

(73) Assignee: Suzuki Motor Corporation, Hamamatsu-Shi, Shizuoka-Ken (JP)

( * ) Notice: Subject to any disclaimer, the term of this patent is extended or adjusted under 35 U.S.C. 154(b) by 351 days.

(21) Appl. No.: 12/732,830

(22) Filed: Mar. 26, 2010

(65) Prior Publication Data

US 2010/0253028 A1  Oct. 7, 2010

(30) Foreign Application Priority Data

Apr. 1, 2009  (JP) .................................. 2009-088931

(51) Int. Cl.
*B62D 21/11* (2006.01)
*B62D 25/20* (2006.01)
*B62D 43/10* (2006.01)

(52) U.S. Cl. ............ 280/124.109; 180/311; 296/187.11; 296/203.04; 296/37.2

(58) Field of Classification Search .................. 180/274, 180/311; 280/834, 124.109; 296/187.11, 296/203.04, 187.03, 1.04, 37.2
See application file for complete search history.

(56) References Cited

U.S. PATENT DOCUMENTS

| 4,746,146 A | * | 5/1988 | Hirabayashi et al. | 280/795 |
| 5,280,957 A | * | 1/1994 | Hentschel et al. | 280/788 |
| 6,511,096 B1 | * | 1/2003 | Kunert et al. | 280/785 |
| 7,976,091 B2 | * | 7/2011 | Yamaguchi et al. | 296/37.2 |
| 2008/0060866 A1 | * | 3/2008 | Worman | 180/233 |

FOREIGN PATENT DOCUMENTS

JP  2006-193046  7/2006

* cited by examiner

*Primary Examiner* — Toan To
*Assistant Examiner* — George Spisich
(74) *Attorney, Agent, or Firm* — Alston & Bird LLP

(57) ABSTRACT

A lower part structure in a vehicle body rear part has a rear suspension frame disposed in rear of a fuel tank and in front of a spare tire and has a mechanism for causing jump up of the rear part of the spare tire under load application from the vehicle rear. The lower part structure is configured so that the center in the vertical direction of the front part of the spare tire is located so as to lap on the extension line of vertical width of a frame in the vehicle width direction of the rear suspension frame, and when the spare tire is moved to the vehicle front by a load applied from the vehicle rear, the spare tire comes into contact with the rear suspension frame directly or indirectly, whereby the rear part of the spare tire is pushed up with the rear suspension frame side being the center, and is turned in the longitudinal direction.

9 Claims, 4 Drawing Sheets

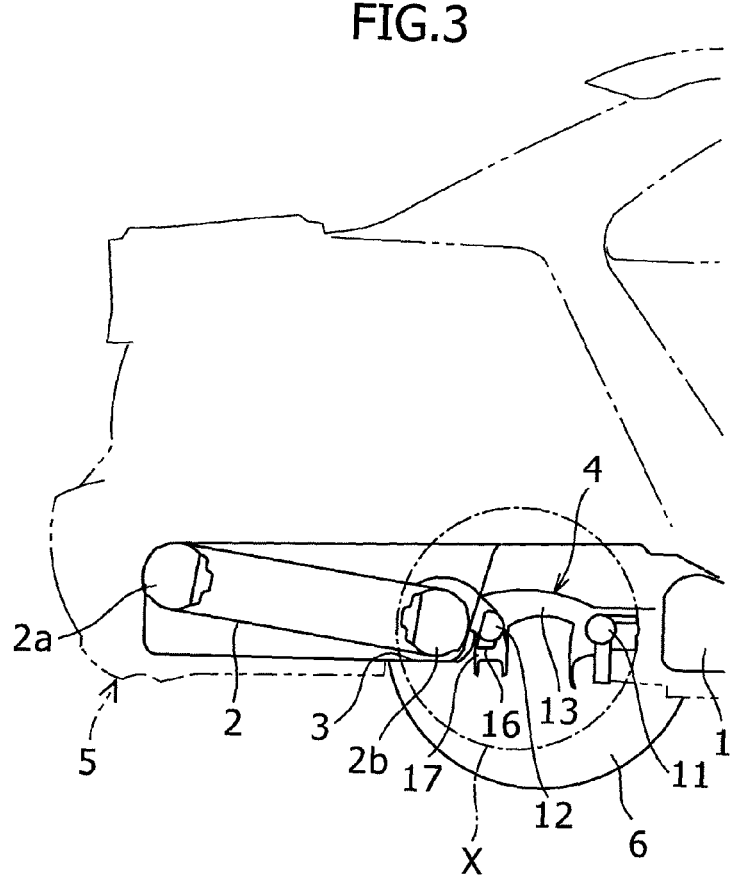

LOWER PART STRUCTURE IN VEHICLE BODY REAR PART

BACKGROUND OF THE INVENTION

The present invention relates a lower part structure in a vehicle body rear part.

Generally, in the lower part of the vehicle body rear part of an automobile, a fuel tank is disposed, and in the vehicle body rear part, a spare tire housing for storing a spare tire disposed horizontally is provided. In such a conventional automobile, to conform to the rule for regulating fuel leakage caused by a load applied from the vehicle rear, it has been difficult to dispose the fuel tank and a canister tank in front of a spare tire that is displaced to the vehicle front, so that the degree of freedom in layout has been restricted.

Accordingly, for example, in the spare tire storage structure disclosed in JP 2006-193046 A, by elaborating the shapes of a rear floor and the like and by providing other members, the configuration is made such that when a load is applied from the vehicle rear, the rear part of the spare tire is pushed up and turned counterclockwise toward the vehicle front, whereby the spare tire is prevented from being pushed out in the horizontal direction toward the vehicle front.

Unfortunately, the above-described conventional storage structure has a problem in that because it is necessary to elaborate the shapes of a rear floor and the like and provide other members, it is difficult to make adjustments to prevent the spare tire from being displaced to the vehicle front, and the increase in number of parts increases the cost.

SUMMARY OF THE INVENTION

The present invention has been made in view of the above circumstances, and accordingly an object thereof is to provide a lower part structure in a vehicle body rear part, in which by utilizing a rigid rear suspension frame, the rear part of a spare tire is pushed up to promote the turning to the vehicle front when a load is applied from the vehicle rear, whereby the displacement of the spare tire to the vehicle front is restrained, and a load applied toward the fuel tank direction is reduced.

To solve the problem with the conventional art, the present invention provides a lower part structure in a vehicle body rear part, which is provided with a rear suspension frame disposed in a rear of a fuel tank and in front of a spare tire and has a mechanism for causing jump up of the rear part of the spare tire under load application from the vehicle rear, wherein the lower part structure is configured so that the center in the vertical direction of the front part of the spare tire is located so as to lap on the extension line of vertical width of a frame in the vehicle width direction of the rear suspension frame, and when the spare tire is moved to the vehicle front by a load applied from the vehicle rear, the spare tire comes into contact with the rear suspension frame directly or indirectly, whereby the rear part of the spare tire is pushed up with the rear suspension frame side being the center, and is turned in the vertical direction.

Also, in the present invention, the rear suspension frame is formed curvedly so that the central part in the vehicle width direction thereof takes a convex shape toward the vehicle front.

Furthermore, in the present invention, the rear suspension frame is provided with a front frame and a rear frame, both extending in the vehicle width direction, and a reinforcing member extending in the vehicle width direction is provided under the rear frame to which a load is applied from the spare tire or a spare tire housing.

In the present invention, the center in the vertical direction of the front part of the spare tire is located over the center in the vertical direction of the rear frame.

Also, in the present invention, the center in the vertical direction of the front part of the spare tire is located over the center in the vertical direction of the total of the rear frame and the reinforcing member.

Furthermore, in the present invention, the center in the vertical direction of the rear frame is located below suspending position of the rear frame to a vehicle body.

In the present invention, the rear suspension frame is made up of a front frame on the vehicle front side and a rear frame on the vehicle rear side, both extending in the vehicle width direction, and braces on both right and left sides that extend in the vehicle longitudinal direction to connect the front frame and the rear frame to each other; and the center in the vertical direction of the rear frame to which a load is applied from the spare tire or a spare tire housing is located below a vehicle body suspension position of the rear frame or located below the front frame or the braces.

Also, in the present invention, the brace is formed curvedly into a convex shape toward the upside.

Furthermore, in the present invention, a planar part is provided on the rear surface of the rear frame facing to the spare tire side.

Also, in the present invention, a reinforcing member having a planar part corresponding to the planar part of the rear frame is provided under the rear frame, and the planar part of the rear frame and the planar part of the reinforcing member are arranged so as to be flush with each other.

As described above, the lower part structure in a vehicle body rear part in accordance with the present invention is provided with the rear suspension frame disposed in a rear of the fuel tank and in front of the spare tire and has the mechanism for jumping up the rear part of the spare tire under load application from the vehicle rear, and is configured so that the center in the vertical direction of the front part of the spare tire is located so as to lap on the extension line of vertical width of the frame in the vehicle width direction of the rear suspension frame, and when the spare tire is moved to the vehicle front by a load applied from the vehicle rear, the spare tire comes into contact with the rear suspension frame directly or indirectly, whereby the rear part of the spare tire is pushed up with the rear suspension frame side being the center, and is turned in the vertical direction. Therefore, when a load is applied to the vehicle body rear part from the vehicle rear, by the rear suspension frame with high rigidity, the spare tire is restrained from being displaced to the vehicle front, and the turning of the rear part of the spare tire in the longitudinal direction to the vehicle front can be promoted by pushing up the rear part of the spare tire.

Thereupon, according to the lower part structure in accordance with the present invention, when a load is applied to the vehicle body rear part from the vehicle rear, even if the spare tire or the spare tire housing are going to move to the vehicle front, the movement is hindered by the rear suspension frame. Therefore, the fuel tank and a canister tank can be prevented from being damaged, and the rules for regulating fuel leakage caused by a load applied from the vehicle rear can be easily met. Specifically, a floor structure for controlling the behavior of the spare tire and the like need not be provided, and the fuel tank and the canister tank can be laid out at positions in front of the position at which the spare tire comes into contact with the rear suspension frame when a load is applied from the vehicle rear, so that the degree of freedom in layout can be increased.

Also, in the present invention, the rear suspension frame is formed curvedly so that the central part in the vehicle width direction thereof takes a convex shape toward the vehicle front. Therefore, even under offset load application from the vehicle rear, the spare tire comes into contact with the convex-shaped part of the rear suspension frame, and the rear suspension frame functions as the turning center, so that the effect of jumping up of the rear part of the spare tire can be achieved. Moreover, under the layout condition under which the spare tire is overlapped with the rear suspension frame in the vertical direction, the rear suspension frame can be installed so as to overlap with the spare tire storage position in the vehicle longitudinal direction, so that the wheel base can easily be made long, thereby increasing the degree of freedom in design.

Furthermore, in the present invention, the rear suspension frame is provided with the front frame and the rear frame, both extending in the vehicle width direction, and the reinforcing member extending in the vehicle width direction is provided under the rear frame to which a load is applied from the spare tire or a spare tire housing. Therefore, the rear frame functions as the turning center of the spare tire, so that the jumping-up effect in the rear part of the spare tire can be promoted.

Also, in the present invention, the center in the vertical direction of the front part of the spare tire is located over the center in the vertical direction of the rear frame, or is located over the center in the vertical direction of the total of the rear frame and the reinforcing member. Therefore, the rear frame functions as the turning center of the spare tire, so that the jumping-up effect in the rear part of the spare tire can further be promoted.

Moreover, in the present invention, the center in the vertical direction of the rear frame is located below suspending position of the rear frame to a vehicle body. Therefore, when the spare tire presses the rear frame on account of load application from the vehicle rear, if the vehicle body suspension position exists above, the pressed portion is deformed while lowering to the downside, so that the tire jumping-up effect can be promoted.

Furthermore, in the present invention, the rear suspension frame is made up of the front frame on the vehicle front side and the rear frame on the vehicle rear side, both extending in the vehicle width direction, and the braces on both right and left sides that extend in the vehicle longitudinal direction to connect the front frame and the rear frame to each other; and the center in the vertical direction of the rear frame to which a load is applied from the spare tire or a spare tire housing is located below a vehicle body suspension position of the rear frame or located below the front frame or the braces. Therefore, when the spare tire presses the rear frame on account of load application from the vehicle rear, the pressed portion is deformed while lowering to the downside, so that the tire jumping-up effect can further be promoted.

Moreover, in the present invention, the brace is formed curvedly into a convex shape toward the upside. Therefore, when the spare tire presses the rear frame on account of load application from the vehicle rear, the pressed portion is deformed while lowering to the downside, so that the tire jumping-up effect can further be promoted.

Also, in the present invention, the planar part is provided on the rear surface of the rear frame facing to the spare tire side, and furthermore, the reinforcing member having the planar part corresponding to the planar part of the rear frame is provided under the rear frame, and the planar part of the rear frame and the planar part of the reinforcing member are arranged so as to be flush with each other. Therefore, when the front part of the spare tire housing comes into contact with the rear parts of the rear frame and the reinforcing member on account of load application from the vehicle rear, the spare tire housing is received firmly by the planar part, and the turning center can be maintained, so that the tire jumping-up effect can be still further promoted.

BRIEF DESCRIPTION OF THE DRAWINGS

Figure 1:
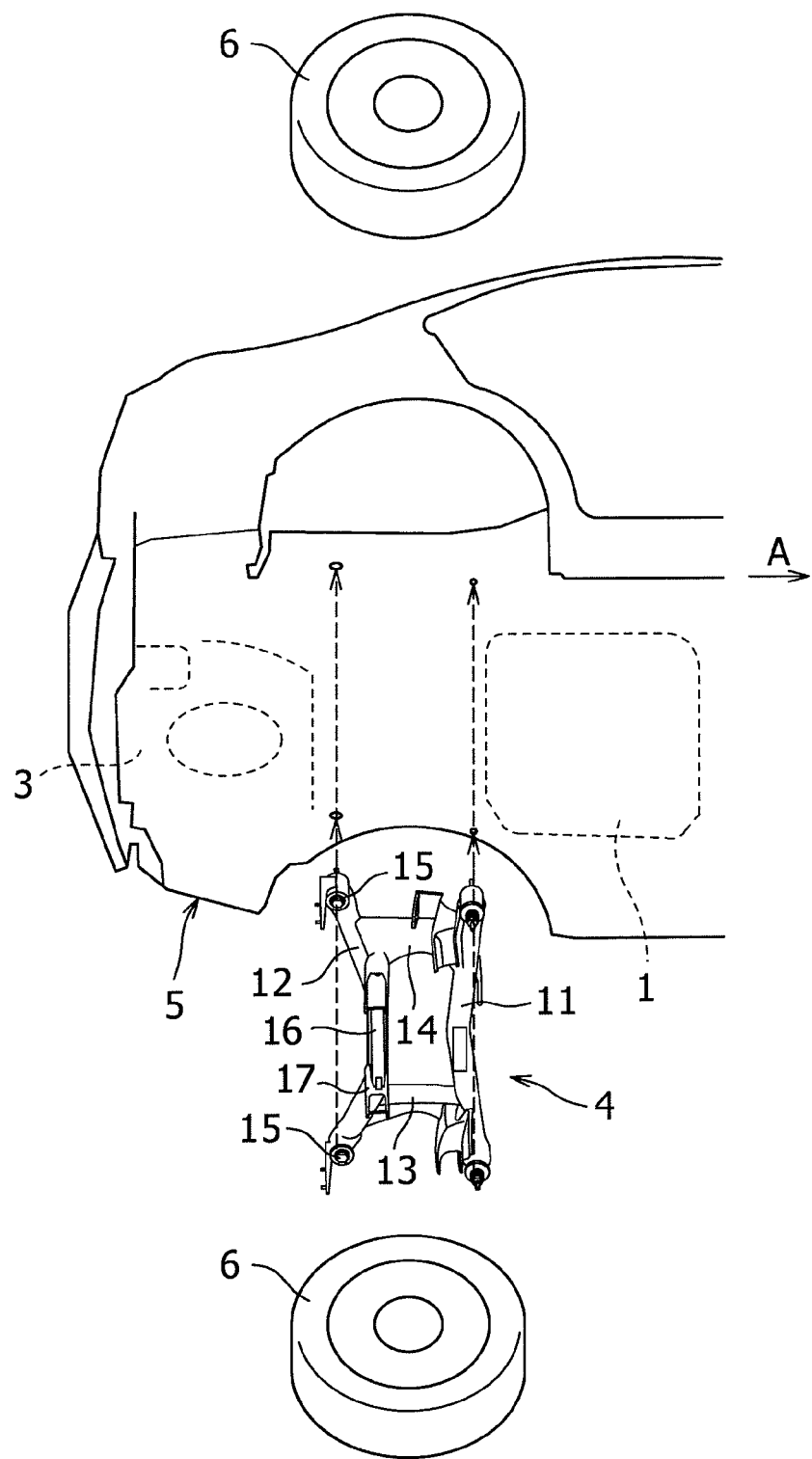
Figure 2:
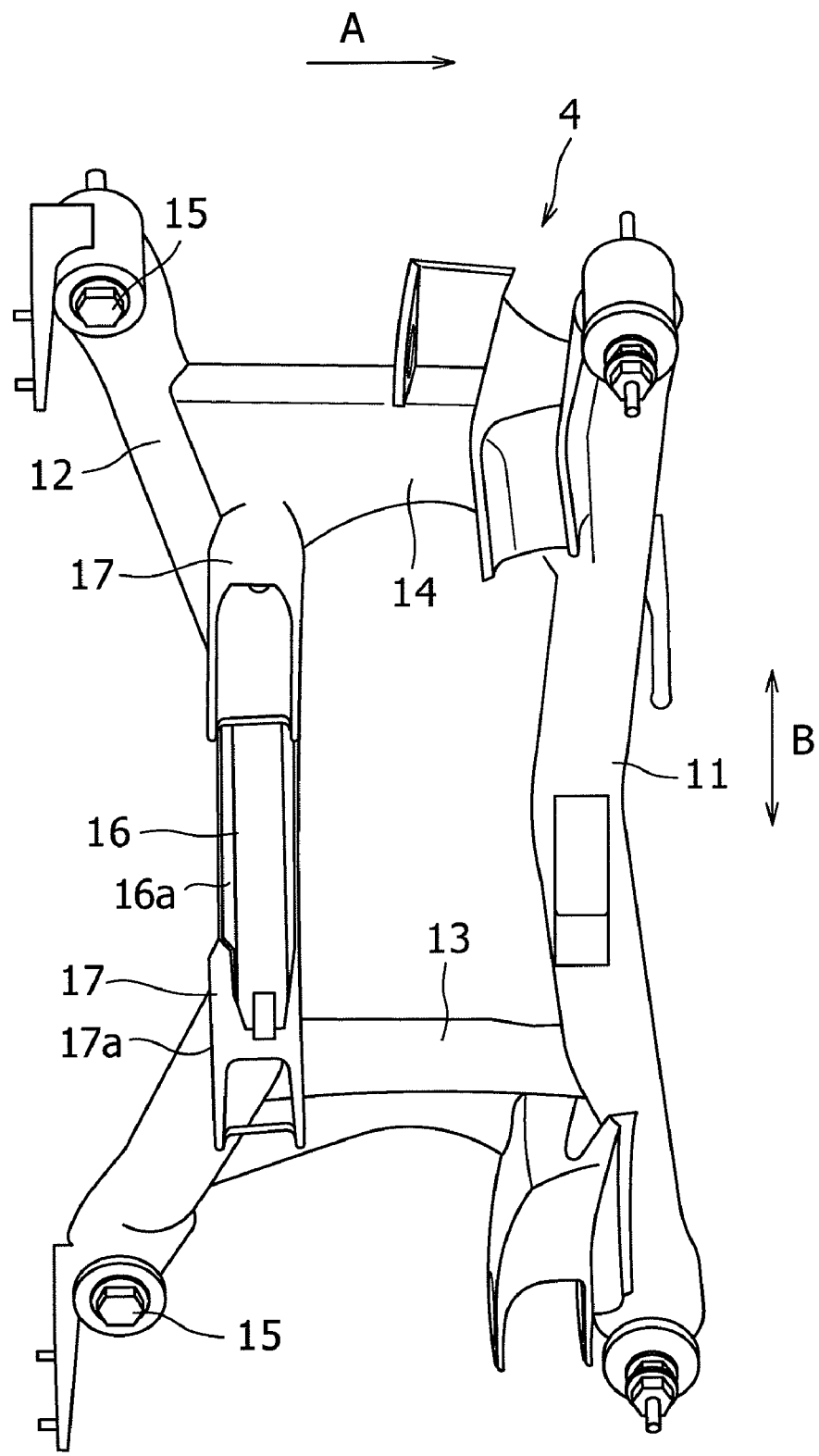
Figure 5:
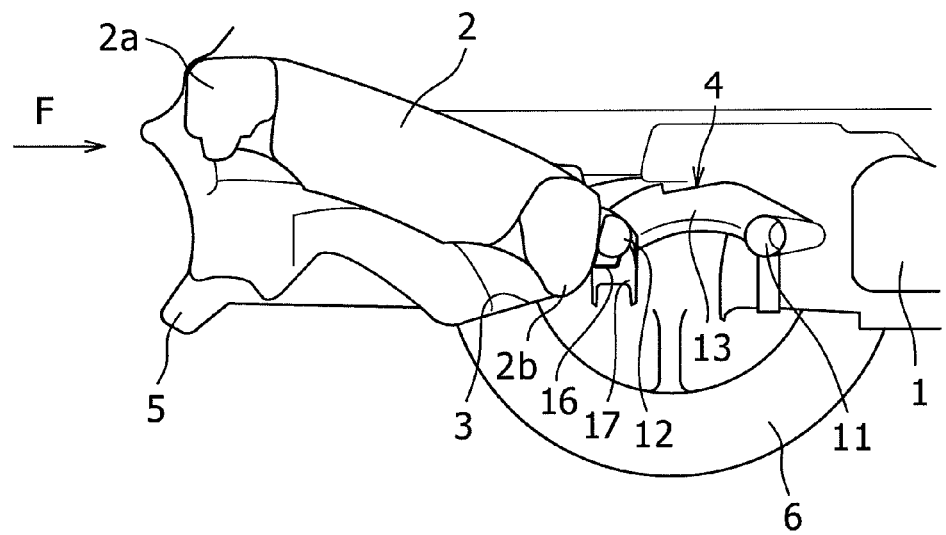
Figure 6:
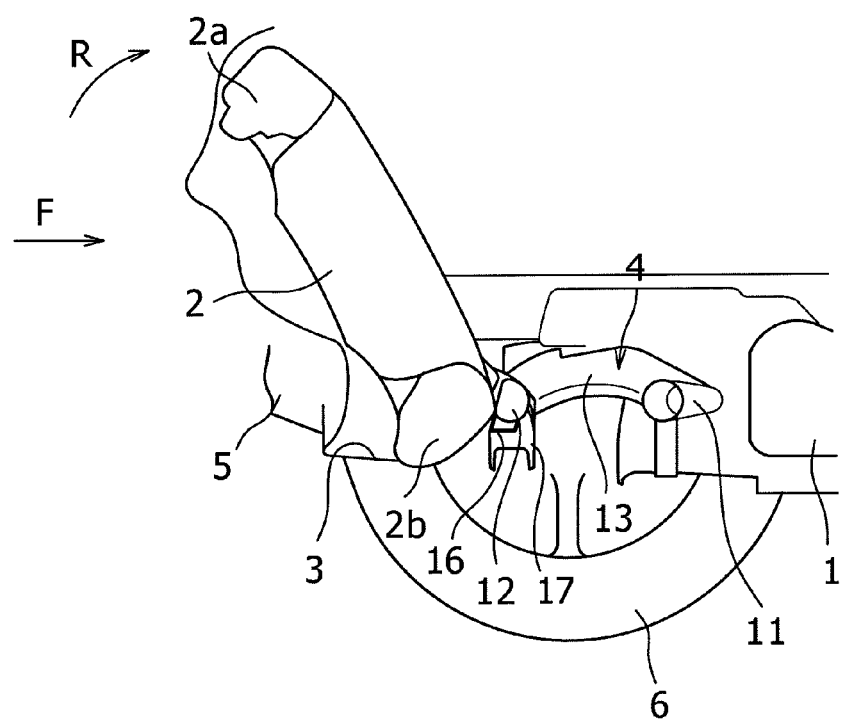

Having thus described the invention in general terms, reference will now be made to the accompanying drawings, which are not necessarily drawn to scale, and wherein:

FIG. 1 is a perspective view of a rear suspension frame in a state before it is attached to the vehicle body, showing a lower part structure in a vehicle body rear part in accordance with an embodiment of the present invention;

FIG. 2 is an enlarged perspective view of the rear suspension frame shown in FIG. 1;

FIG. 3 is a side view showing the arrangement relationship between a rear suspension frame and a spare tire in a vehicle body rear part to which the lower part structure in accordance with an embodiment of the present invention is applied;

FIG. 4 is an enlarged view of portion X in FIG. 3;

FIG. 5 is a side view showing a state in which a spare tire and a spare tire housing come into contact with a rear suspension frame when a load is applied from the vehicle rear in a vehicle body rear part to which the lower part structure in accordance with an embodiment of the present invention is applied; and FIG. 6 is a side view showing a state in which the rear part of a spare tire is pushed up from the state shown in FIG. 5 with the rear suspension frame side being the center and is turned in the longitudinal direction.

DETAILED DESCRIPTION OF THE DRAWINGS

The present invention now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIGS. 1 to 6 show a lower part structure in a vehicle body rear part in accordance with an embodiment of the present invention.

In the lower part of the vehicle body rear part of an automobile in accordance with the embodiment of the present invention, as shown in FIGS. 1, 3 and 4, a fuel tank 1 is disposed, and in the vehicle body rear part, a spare tire housing 3, which is a storage concave part for containing a horizontally disposed spare tire 2, is provided. At a position in rear of the fuel tank 1 and in front of the spare tire 2 and the spare tire housing 3, a rear suspension frame 4 is disposed. The rear suspension frame 4 is installed between a vehicle body 5 and a wheel 6. The rear suspension frame 4, which constitutes a rear suspension system for damping impacts and vibrations transmitted from the road surface, is disposed so as to match the installation height of the mounted spare tire 2. In the figures, an arrow mark A indicates the vehicle front.

In the lower part of the vehicle body rear part in accordance with the embodiment of the present invention, a mechanism for jumping up a rear part 2a of the spare tire 2 on account of load application from the vehicle rear is provided. Therefore, in the state in which the spare tire 2 is contained horizontally in the spare tire housing 3, the spare tire 2 is tiltingly disposed in the state in which the rear part 2a thereof is positioned above a front part 2b so that the spare tire 2 is tilted to the front.

The configuration is made such that the center C in the vertical direction of the front part 2b of the spare tire 2 is located so as to lap on the extension line of vertical width of a frame in the vehicle width direction (a rear frame described later) of the rear suspension frame 4, and when the spare tire 2 is moved to the vehicle front by a load applied from the vehicle rear, the spare tire 2 comes into contact with the rear suspension frame 4 directly (or indirectly via the spare tire housing 3), whereby the rear part 2a of the spare tire 2 is pushed up with the rear suspension frame 4 side being the center, and is turned in the vertical direction.

As shown in FIGS. 1 to 4, the rear suspension frame 4 of this embodiment is made up of a front frame 11 on the vehicle front side and a rear frame 12 on the vehicle rear side, both extending in the vehicle width direction (the direction indicated by an arrow mark B), and braces 13 and 14 on both right and left sides that extend in the vehicle longitudinal direction to connect the front frame 11 and the rear frame 12 to each other. The front frame 11 and the rear frame 12 are bendedly formed by using a pipe material. The center in the vertical direction of the rear frame 12 to which a load is applied from the spare tire 2 or the spare tire housing 3 is located below suspending position 15 of the rear frame 12 to a vehicle body. Alternatively, the center in the vertical direction of the rear frame 12 is located below the front frame 11 or the braces 13 and 14.

The braces 13 and 14 each are formed curvedly into a convex shape toward the upside. Thereby, when the spare tire 2 presses the rear frame 12 on account of load application from the vehicle rear, the pressed portion is deformed while lowering to the downside.

Of the rear suspension frame 4, the rear frame 12 is formed curvedly so that the central part in the vehicle width direction (the direction indicated by the arrow mark B) thereof takes a convex shape toward the vehicle front (the direction indicated by the arrow mark A). Thereby, the configuration is made such that the spare tire 2 or the spare tire housing 3 that moves to the vehicle front under load application from the vehicle rear comes into contact with the convex-shaped portion in the central part of the rear frame 12. Furthermore, the configuration is made such that even under offset load application, the spare tire 2 comes into contact with the convex-shaped portion of the rear suspension frame 4, and the load is applied along the shape of the rear suspension frame 4, so that the rear suspension frame 4 functions as the turning center.

Under the rear frame 12, a first reinforcing member 16 and second reinforcing members 17 for reinforcing the rear frame 12 are provided. These reinforcing members 16 and 17 are installed so as to extend along the vehicle width direction, and the second reinforcing members 17 are provided on both right and left sides of the first reinforcing member 16. When an offset load is applied, a high load off-centered from the center of the rear suspension frame 4 is applied to the second reinforcing member 17. Therefore, the second reinforcing members 17 have higher rigidity than the first reinforcing member 16.

The center C in the vertical direction of the front part 2b of the spare tire 2 is located over the center in the vertical direction of the width of the total of the rear frame 12 and the first reinforcing member 16, and the configuration is made such that the rear frame 12 functions as the turning center of the spare tire 2. If the first reinforcing member 16 is not provided, the center C in the vertical direction of the front part 2b of the spare tire 2 is located over the center in the vertical direction of the rear frame 12.

On the rear surface of the rear frame 12 facing to the spare tire 2 side, as shown in FIG. 4, a planar part 12a formed by collapsing a pipe material is provided. Also, the first reinforcing member 16 provided under the rear frame 12 has a planar part 16a corresponding to the planar part 12a of the rear frame 12. On the rear surface side facing to the spare tire 2 side, the planar part 12a of the rear frame 12 and the planar part 16a of the first reinforcing member 16 are arranged so as to be flush in the vertical direction. The planar parts 12a and 16a of the rear frame 12 and the first reinforcing member 16 receive the spare tire housing 3 when the front part of the spare tire housing 3 comes into contact with the rear parts of the rear frame 12 and the first reinforcing member 16 on account of load application from the vehicle rear, and have a function of keeping the turning center of the spare tire 2. The rear surface side of the second reinforcing member 17 facing to the spare tire 2 side is formed into a planar part 17a extending downward so as to be capable of receiving the spare tire housing 3.

In an automobile to which the lower part structure in a vehicle body rear part in accordance with the embodiment of the present invention is applied, as shown in FIG. 5, when a load F directed to the vehicle front from the vehicle rear is applied to the rear part of the vehicle body 5, the load F is transmitted to the rear part of the spare tire housing 3 via the vehicle body 5 and the like. Accordingly, the spare tire housing 3 is pressed to the vehicle front together with the spare tire 2 and is moved while being deformed, and comes into contact with the planar parts 12a and 16a of the rear frame 12 and the first reinforcing member 16 of the rear suspension frame 4 or the planar part 17a of the second reinforcing member 17, and stops.

Thereafter, as shown in FIG. 6, when the spare tire housing 3 is further deformed by the load F, the rear part 2a of the spare tire 2 disposed so as to tilt forward is caused to jump up as indicted by an arrow mark R with the front part 2b on the rear frame 12 side being the center, and is turned in the vertical direction toward the vehicle front.

Thus, in the lower part structure in a vehicle body rear part in accordance with the embodiment of the present invention, since the center C in the vertical direction of the front part 2b of the spare tire 2 is located so as to lap on the extension line of vertical width of the rear frame 12 of the rear suspension frame 4, when the spare tire housing 3 and the spare tire 2 are moved to the vehicle front by the load F applied from the vehicle rear, the spare tire housing 3 and the spare tire 2 come into contact with the planar part 12a of the rear frame 12 and the planar part 16a of the first reinforcing member 16 or the planar part 17a of the second reinforcing member 17, and thereby the rear part 2a of the spare tire 2 is caused to jump up with the rear frame 12 side being the center, and is turned in the vertical direction. Therefore, when the load F is applied to the vehicle body rear part from the vehicle rear, the rear suspension frame 4 with high rigidity can be utilized, and the movement of the spare tire 2 to the vehicle front can be hindered effectively by the rear frame 12 and the reinforcing members 16 and 17. Thereby, the fuel tank 1 and the like located in front of the rear suspension frame 4 can be prevented from being damaged, and the rules for regulating fuel leakage caused by a load applied from the vehicle rear can be easily met. Also, a floor structure for controlling the behavior of the spare tire 2 and the spare tire housing 3 need not be provided, so that the degree of freedom in layout of the fuel tank 1 and the like can be increased by simple construction.

Also, in the lower part structure of this embodiment, since the central part in the vehicle width direction of the rear frame 12 is formed curvedly so as to take a convex shape toward the vehicle front, even when an offset load or a load from the slantwise upside is applied from the vehicle rear, the movement of the spare tire 2 and the spare tire housing 3 to the vehicle front can be hindered.

The above is a description of an embodiment of the present invention. The present invention is not limited to this embodiment, and various modifications and changes can be made based on the technical concept of the present invention.

For example, in the above-described embodiment, the reinforcing members 16 and 17 are separate members. However, one integrally formed reinforcing member also achieves the same effect.

What is claimed is:

1. A lower part structure in a vehicle body rear part, comprising:
a rear suspension frame disposed to a rear side of a fuel tank and in front of a spare tire disposed generally horizontally in a spare tire housing, the rear suspension frame comprising a front frame and a rear frame, both extending in the vehicle width direction, and a reinforcing member extending in the vehicle width direction and located under the rear frame, the reinforcing member comprising a first reinforcing member and second reinforcing members, the second reinforcing members being located on both right and left sides of the first reinforcing member and having higher rigidity than the first reinforcing member, wherein a rear part of the spare tire is caused to jump up under load application from the rear toward the front of the vehicle and the spare tire or the spare tire housing is caused to apply load on the reinforcing member as the spare tire pivots about a pivot point toward a vertical orientation,
wherein the lower part structure is configured so that a midpoint of a tire height in a vertical direction at a front part of the spare tire is located so as to overlap a vertical extent of the rear frame, and when the spare tire is moved toward the vehicle front by a load applied from the vehicle rear, the spare tire comes into contact with the rear suspension frame directly or indirectly, and wherein the rear frame is at or near the pivot point for the spare tire.

2. The lower part structure in a vehicle body rear part according to claim 1, wherein the rear suspension frame includes braces on both right and left sides that extend in the vehicle longitudinal direction to connect the front frame and the rear frame to each other, and a center of the rear frame in the vertical direction, to which a load is applied from the spare tire or the spare tire housing, is located below a vehicle body suspension position of the rear frame or located below the front frame or the braces, and wherein each brace connects to the rear frame at a location adjacent to the respective second reinforcing member.

3. The lower part structure in a vehicle body rear part according to claim 2, wherein the rear frame is curvedly formed so that a central part of the rear frame with respect to the vehicle width direction takes a convex shape toward the vehicle front, and wherein both right and left side portions of the central part are disposed adjacent to the respective second reinforcing members.

4. The lower part structure in a vehicle body rear part according to claim 2, wherein each brace is curved and is convex in an upward direction so that a longitudinal midpoint of each brace is vertically higher than opposite end portions of the brace.

5. The lower part structure in a vehicle body rear part according to claim 1, wherein the midpoint of the front part of the spare tire with respect to the vertical direction is located at the same vertical location as a center of the rear frame with respect to the vertical direction.

6. The lower part structure in a vehicle body rear part according to claim 1, wherein the midpoint of the front part of the spare tire with respect to the vertical direction is located at the same vertical location as a center of the total of the rear frame and the reinforcing member with respect to the vertical direction.

7. The lower part structure in a vehicle body rear part according to claim 1, wherein a center of the rear frame with respect to the vertical direction is located vertically lower than a vehicle body suspension of the rear frame.

8. The lower part structure in a vehicle body rear part according to claim 1, wherein a planar part is provided on a rear surface of the rear frame facing the spare tire.

9. The lower part structure in a vehicle body rear part according to claim 8, wherein the first reinforcing member has a planar part corresponding to the planar part of the rear frame, and the planar part of the rear frame and the planar part of the first reinforcing member are arranged so as to be flush with each other.

* * * * *